March 2, 1943. G. G. GREULICH Re. 22,278

GRATING STRUCTURE

Original Filed Nov. 15, 1939

Inventor:
GERALD G. GREULICH,
by: John E. Jackson
his Attorney.

Reissued Mar. 2, 1943 Re. 22,278

UNITED STATES PATENT OFFICE 22,278

GRATING STRUCTURE

Gerald G. Greulich, Mount Lebanon, Pa.

Original No. 2,286,204, dated June 16, 1942, Serial No. 304,605, November 15, 1939. Application for reissue November 16, 1942, Serial No. 465,767

4 Claims. (Cl. 189—82)

This invention relates to grating structures, and more particularly to those which are constructed and arranged to function as open bridge decks or heavy duty floors. In devices of this type the open grating structure directly supports the load imposed by the traffic, provides increased traction, and is easily kept clean. For the sake of both durability and appearance, it is desirable that such grating structures be galvanized.

It is among the objects of the present invention to provide a novel and inexpensive grating structure which is capable of functioning as a highly efficient open bridge deck or heavy duty floor.

The foregoing and other objects will be apparent after referring to the drawing, in which.

Figure 1:
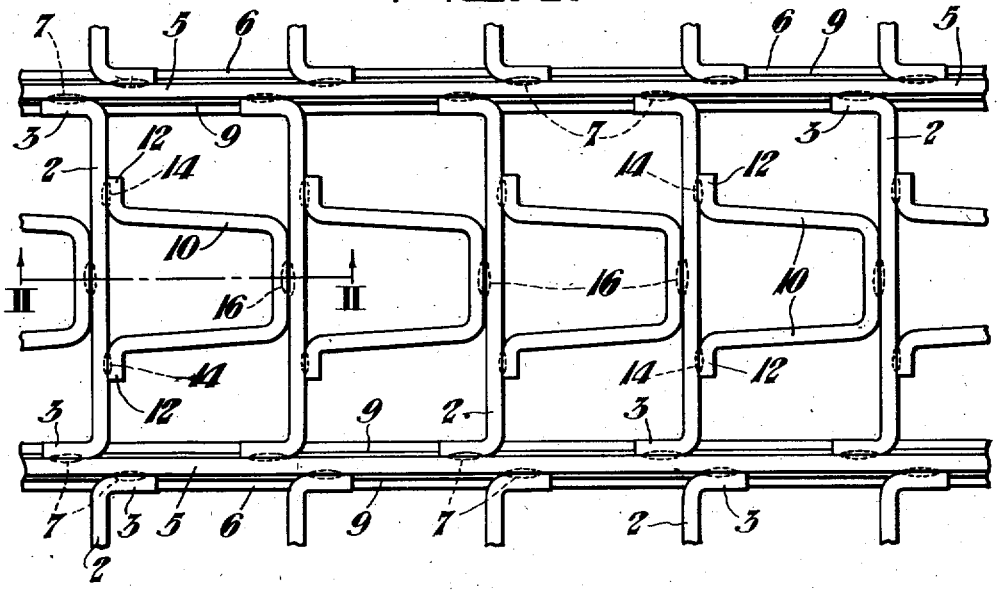
Figure 1 is a fragmentary plan of the device of the present invention.

Referring more particularly to the drawing, the numeral 2 designates a plurality of cross members, each of which comprises a metallic bar having its ends bent at right angles, as shown at 3. As will be seen from an inspection of Figure 2, the cross members 2 are rectangular in section and, therefore, may be readily rolled and subsequently bent in the manner shown.

Figure 3:
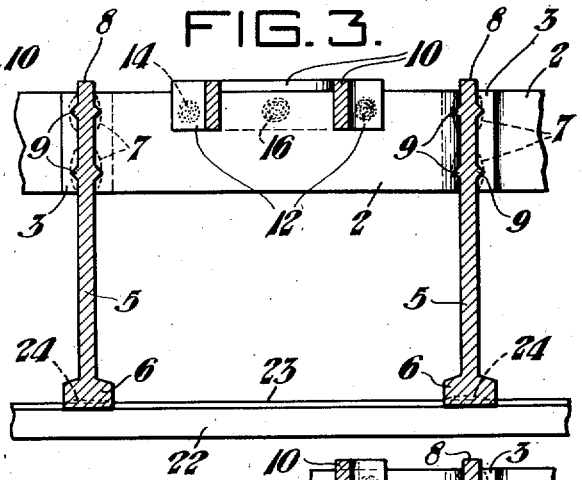
Figure 3 is a sectional view on the line III—III of Figure 2.

A plurality of cross members 2 are assembled in parallelism and with their right-angularly bent end portions 3 extending in the same direction. The right-angularly bent portions 3 of the cross members 2 are connected to main carrying members which are assembled in parallelism and designated hereinafter at 5. As shown in Figure 3, these main carrying members 5 comprise rolled rectangular shapes having enlarged base members 6. In joining the right-angularly bent portions 3 of the cross members 2 to the main carrying members 5, the former are held against the adjacent side faces of the upper ends of the main carrying members 5 and electrically pressure-welded thereto, as shown at 7. Referring more particularly to Figure 3, it will be noted that the ends of the main carrying members 5 are permitted to extend upwardly beyond the upper edges of the cross members 2, as shown at 8. While this arrangement is shown, the position of the bars could be readily reversed so that the ends of the main carrying bars 5 would be below the upper edges of the cross members 2.

According to the teachings of the present invention, the cross members 2 are connected to each other by means in addition to the main carrying members 5, the said means comprising a series of U-shaped members 10 having their open ends bent oppositely at right angles, as shown at 12.

Referring more particularly to Figure 1, the right-angularly bent ends 12 of each of the U-shaped members 10 are abutted against the face of one of the cross members 2 which is opposite the direction of extension of the right-angular end portions 3 thereof and electrically pressure-welded, as shown at 14. The base or bottom of each of the U-shaped members 10 is abutted against the face of a cross member 2 which is most adjacent the right-angularly bent end portions 3 thereof and electrically pressure-welded thereto, as shown at 16.

Figure 2:
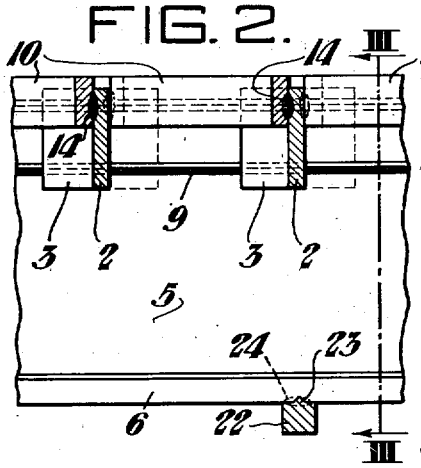
Figure 2 is a sectional elevation on the line II—II of Figure 1.

Referring to Figures 2 and 3, it will be noted that the upper edges of the U-shaped members 10, which are designated hereinafter as filler members, lie in a plane above the upper edges of the cross members 2 and coextensive with the upper ends 8 of the main carrying members 5. While the preceding arrangement is shown on the drawing, the arrangement of the bars could be such that in Figures 2 and 3 the upper edges of the U-shaped members, or filler members, could lie in a plane below the upper edges of the cross members 2. Such construction provides for increased traction.

Figure 5:
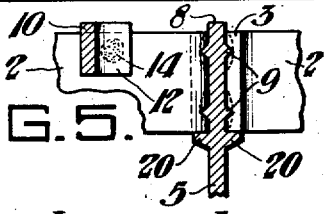
Figure 5 is a fragmentary sectional view of a modification.

Referring to Figures 3 and 5, it will be noted that those portions of the adjacent side faces of the main carrying members 5 to which the cross members 2 are welded are provided with ribs 9 to provide for increased efficiency during welding and greater strength after the welding operation has been performed.

Referring to Figure 5 of the drawing, it will be noted that the teaching of the invention comprises the provision of lugs 20 on the side faces of the main carrying members 5 which carry the cross members 2. Such lugs 20 provide for protection in case of breakage of one of the welds 7 connecting the cross member 2 with the main carrying members 5.

The ribs 23 on the upper faces of bars 22 are provided to facilitate pressure welding of the bars 22 to the bottoms of the main carrying members 5. There are no recesses 24 provided in the enlarged bottom portion 6 for the main carrying members. The ribs 23 are mashed or pressed into the enlarged bottom portions 6 of the main carrying members when the metal is softened and brought to a welding temperature by the electric pressure welding method. These bracing bars 22 are provided at mid-point or third-points of span of the main carrying members.

Figure 4:
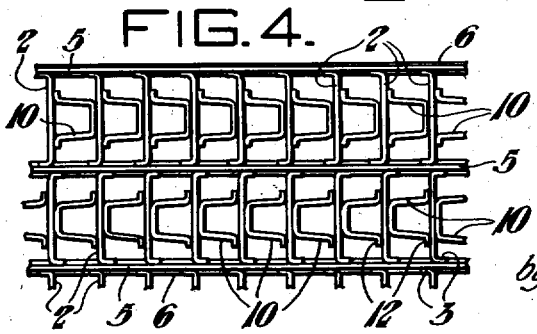
Figure 4 is a fragmentary plan illustrating the preferred manner of assembling several units of the device of the invention.

Referring to Figures 1 and 4, it will be noted that the main carrying members 5 are connected on both sides to cross members 2, but that the entire angularly bent portions 3 of the next adjacent series of cross members 2 extend in the opposite direction and also that the welds 7 are not directly opposed to each other. These features provide for further increased strength.

The device of the invention enables the full section of all members for load carrying availability. The grating structure uses no holes whatever and each of the individual instrumentalities thereof is a rolled shape. All of the welds are of the electric "pressure" type, not only providing for low cost per intersection coupled with high speed of production, but eliminating slag or chemical deposits at the welds which might be difficult to remove by pickling or which might interfere with the subsequent galvanizing operation.

The feature of the utilization of the full cross section of the component parts of the grating structure to carry loads or stresses is especially important in the case of the main carrying members 5 where a big reduction for the effective area does not have to be made on account of openings. The device of the invention is extremely flexible in assembly, permitting variations in width of units without introducing cost complications.

While I have shown and described several specific embodiments of the present invention, it will be seen that I do not wish to be limited exactly thereto, since various modifications may be made without departing from the scope of the invention, as defined by the following claims.

I claim:

1. A grating structure for open bridge decks and the like comprising, in combination, a plurality of primary members arranged in parallelism, a plurality of parallel substantially horizontally disposed U-shaped secondary members, the legs of said secondary members being secured to said primary members, and a plurality of horizontally disposed U-shaped tertiary members, said tertiary members being similarly disposed and aligned with respect to each other and provided at the ends of the legs thereof with right-angular flanges which are secured to said secondary members, said primary members and said tertiary members having their upper edges occupying a common plane, the upper edges of said secondary members being disposed below the corresponding edges of said primary members and said tertiary members whereby the latter provide for increased traction.

2. A grating structure for open bridge decks and the like, comprising, in combination, a plurality of primary members arranged in parallelism, a plurality of parallel substantially horizontally disposed U-shaped secondary members, means carried by said primary members for supporting said secondary members, the legs of said secondary members being secured to said primary members, and a plurality of horizontally disposed U-shaped tertiary members, said tertiary members being similarly disposed and aligned with respect to each other and provided at the ends of the legs thereof with right-angular flanges which are secured to said secondary members, said primary members and said tertiary members having their upper edges occupying a common plane, the upper edges of said secondary members being disposed below the corresponding edges of said primary members and said tertiary members whereby the latter provide for increased traction.

3. A grating structure for open bridge decks and the like comprising, in combination, a plurality of primary members arranged in parallelism, a plurality of parallel substantially horizontally disposed U-shaped secondary members, the legs of said secondary members being secured to said primary members, and a plurality of horizontally disposed U-shaped tertiary members, said tertiary members being similarly disposed and aligned with respect to each other and provided at the ends of the legs thereof with right-angular flanges which are secured to said secondary members.

4. A grating structure for open bridge decks and the like comprising, in combination, a plurality of primary members arranged in parallelism, a plurality of parallel substantially horizontally disposed U-shaped secondary members, the legs of said secondary members being secured to said primary members, and a plurality of horizontally disposed U-shaped tertiary members, said tertiary members being similarly disposed and aligned with respect to each other and provided at the ends of the legs thereof with right-angular flanges which are secured to said secondary members, said primary members and said tertiary members having their upper edges occupying a common plane, the upper edges of said secondary members being disposed in a different horizontal plane than the corresponding edges of said primary members and said tertiary members to provide for increased traction.

GERALD G. GREULICH.